US010141007B1

United States Patent
Kim et al.

(10) Patent No.: US 10,141,007 B1
(45) Date of Patent: Nov. 27, 2018

(54) SOUND/VIBRATION SPECTRUM ANALYZING DEVICE AND METHODS OF ACQUIRING AND ANALYZING FREQUENCY INFORMATION

(71) Applicant: SAMSUNG ELECTRONICS CO., LTD., Suwon-si (KR)

(72) Inventors: Cheheung Kim, Yongin-si (KR); Sungchan Kang, Hwaseong-si (KR); Sangha Park, Seoul (KR); Yongseop Yoon, Seoul (KR); Choongho Rhee, Anyang-si (KR); Hyeokki Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/899,884

(22) Filed: Feb. 20, 2018

(30) Foreign Application Priority Data

Sep. 19, 2017 (KR) .......................... 10-2017-0120515

(51) Int. Cl.
  *H04R 29/00* (2006.01)
  *G10L 25/18* (2013.01)
  *H04R 3/04* (2006.01)

(52) U.S. Cl.
  CPC ................ *G10L 25/18* (2013.01); *H04R 3/04* (2013.01); *H04R 29/00* (2013.01)

(58) Field of Classification Search
  CPC ............ G10L 25/18; H04R 3/04; H04R 29/00
  See application file for complete search history.

(56) References Cited

U.S. PATENT DOCUMENTS

| 8,837,757 B2 | 9/2014 | Rung et al. |
| 2016/0050506 A1 | 2/2016 | Kim |

FOREIGN PATENT DOCUMENTS

| JP | 2006-145404 A | 6/2006 |
| KR | 10-0612213 B1 | 8/2006 |

OTHER PUBLICATIONS

U.S. Appl. No. 15/450,416, filed Mar. 6, 2017, Cheheung Kim.

*Primary Examiner* — Mark Fischer
(74) *Attorney, Agent, or Firm* — Sughrue Mion, PLLC

(57) ABSTRACT

A sound and vibration spectrum analyzing device includes a plurality of resonators having different center frequencies, the plurality of resonators being configured to acquire a spectrum of sound and vibration. The sound and vibration spectrum analyzing device is configured to analyze the spectrum of sound and vibration, based on a first frequency signal of a first resonance mode and a second frequency signal of a second-order or higher resonance mode of at least some of the plurality of resonators.

25 Claims, 18 Drawing Sheets

1$^{st}$ mode

2$^{nd}$ mode

< COMPARATIVE EXAMPLE > ional information and the second resonance fre-

SOUND/VIBRATION SPECTRUM ANALYZING DEVICE AND METHODS OF ACQUIRING AND ANALYZING FREQUENCY INFORMATION

CROSS-REFERENCE TO RELATED APPLICATION

This application claims priority from Korean Patent Application No. 10-2017-0120515, filed on Sep. 19, 2017, in the Korean Intellectual Property Office, the disclosure of which is incorporated herein by reference in its entirety.

BACKGROUND

1. Field

Apparatuses and methods consistent with example embodiments relate to sound/vibration spectrum analyzing devices and methods of acquiring and analyzing frequency information.

2. Description of the Related Art

Spectrum analyzers for analyzing a spectrum of sound or vibration may be used in voice recognition, speaker recognition, situation recognition, etc. in mobile phones, computers, home appliances, automobiles, smart home environments, etc., or may be used to analyze vibration information by being mounted in buildings, automobiles, home appliances, etc.

Frequency domain information of a sound signal may be obtained as the sound signal input to a microphone having a wideband characteristic is Fourier transformed by passing through an analog digital converter (ADC). In the frequency information acquiring method, however, the amount of calculations may be large due to the Fourier transform, and it may difficult to simultaneously improve both resolutions of time information and frequency information because frequency resolution and time resolution have a trade-off relationship.

SUMMARY

Sound/vibration spectrum analyzing devices including a resonator array to acquire a spectrum of sound and/or vibration are provided.

Sound/vibration spectrum analyzing devices that may improve resolution, reduce device area/size, and improve output of an individual resonator are provided.

Sound/vibration spectrum analyzing devices that may have excellent resolution while having a small size are provided.

Methods of acquiring and analyzing frequency information related to the sound/vibration spectrum analyzing devices are provided.

According to an aspect of an example embodiment, there is provided a sound and vibration spectrum analyzing device including a plurality of resonators having different center frequencies, the plurality of resonators being configured to acquire a spectrum of sound and vibration. The sound and vibration spectrum analyzing device is configured to analyze the spectrum of sound and vibration, based on a first frequency signal of a first resonance mode and a second frequency signal of a second-order or higher resonance mode of at least some of the plurality of resonators.

The sound and vibration spectrum analyzing device may further include a band signal divider that separates the first frequency signal of the first resonance mode and the second frequency signal of the second-order or higher resonance mode of the at least some of the plurality of resonators.

The band signal divider may include one of a diplexer, a duplexer, and a triplexer.

The band signal divider may include a low pass filter and a high pass filter, and each of the low pass filter and the high pass filter has a same cutoff frequency.

The band signal divider may have a cutoff frequency between a first resonance frequency group of the first resonance mode and a second resonance frequency group of a second resonance mode of the plurality of resonators.

The plurality of resonators may include an n number of resonators, a first resonance frequency of the first resonance mode of a first resonator may be $f\_11$, a second resonance frequency of a second resonance mode of the first resonator may be $f\_12$, and resonance frequencies of the first resonance mode of second to n-th resonators may be between the first resonance frequency and the second resonance frequency.

Resonance frequencies of the first resonance mode of the plurality of resonators may be linearly arranged at same intervals.

Resonance frequencies of the first resonance mode of the plurality of resonators may be non-linearly arranged at varying intervals.

The plurality of resonators may include a first resonator and a second resonator, each of the first resonator and the second resonator may have a same resonance frequency in the first resonance mode, and the first resonator and the second resonator may have different resonance frequencies in a second resonance mode.

The sound and vibration spectrum analyzing device may include effective band filters of an amount two times or more than a number of the plurality of resonators.

The plurality of resonators may include an electromechanical resonator structure.

The plurality of resonators may include a cantilever structure.

The plurality of resonators may further include a mass body disposed on the cantilever structure.

The plurality of resonators may include first resonators of a first group, and the first resonators may have different lengths.

An electronic apparatus may include the sound and vibration spectrum analyzing device.

According to an aspect of an example embodiment, there is provided a sound and vibration spectrum analyzing device including a plurality of resonators having different center frequencies, the plurality of resonators being configured to acquire a spectrum of sound and vibration, and a band signal divider separating a first frequency signal of a first resonance mode and a second frequency signal of a second-order or higher resonance mode of each of the plurality of resonators.

The sound and vibration spectrum analyzing device may be configured to analyze the spectrum of sound and vibration, based on the first frequency signal of the first resonance mode and the second frequency signal of the second-order or higher resonance mode that are separated, of each of the plurality of resonators.

The band signal divider may include one of a diplexer, a duplexer, and a triplexer.

The band signal divider may include a low pass filter and a high pass filter, and each of the low pass filter and the high pass filter may have a same cutoff frequency.

The band signal divider may have a cutoff frequency between a first resonance frequency group of the first resonance mode and a second resonance frequency group of a second resonance mode of the plurality of resonators.

The plurality of resonators may include an n number of resonators, a first resonance frequency of the first resonance mode of a first resonator may be f_11, a second resonance frequency of a second resonance mode of the first resonator may be f_12, and resonance frequencies of the first resonance mode of second to n-th resonators may be between the first resonance frequency and the second resonance frequency.

According to an aspect of an example embodiment, there is provided a method of analyzing a sound and vibration spectrum using a plurality of resonators having different center frequencies, the method including acquiring a first frequency signal of a first resonance mode of at least some of the plurality of resonators, acquiring a second frequency signal of a second resonance mode of the at least some of the plurality of resonators, and analyzing each of the first frequency signal of the first resonance mode and the second frequency signal of the second resonance mode.

The method may further include separating the first frequency signal of the first resonance mode and the second frequency signal of the second resonance mode of the at least some of the plurality of resonators.

The first frequency signal of the first resonance mode and the second frequency signal of the second resonance mode that are separated may be simultaneously output by an individual resonator of the at least some of the plurality of resonators.

The method may further include acquiring and analyzing a third frequency signal of a third-order or higher resonance mode of the at least some of the plurality of resonators.

According to an aspect of an example embodiment, there is provided a sound and vibration spectrum analyzing device including a substrate, a membrane disposed on the substrate, and a plurality of resonators disposed on the membrane, the plurality of resonators having different center frequencies, and the plurality of resonators being configured to acquire a spectrum of sound and vibration. Each of the plurality of resonators includes a first electrode disposed on the membrane, and a second electrode disposed on the membrane and spaced apart from the first electrode.

Either one or both of ends of the second electrode may be disposed on the membrane.

The first electrode may be spaced apart from the membrane, and either one or both of ends of the first electrode may be disposed on the membrane.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1A:
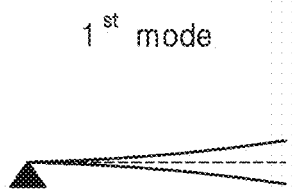
FIGS. 1A and 1B are conceptual diagrams for explaining a first resonance mode and a second resonance mode of a resonator that are applicable to a sound/vibration spectrum analyzing device, according to an example embodiment.

Reference will now be made in detail to example embodiments, examples of which are illustrated in the accompanying drawings, wherein like reference numerals refer to like elements throughout. Also, the size of each layer illustrated in the drawings may be exaggerated for convenience of explanation and clarity. In this regard, the present example embodiments may have different forms and may not be construed as being limited to the descriptions set forth herein. Accordingly, the example embodiments are described below, by referring to the figures, to explain aspects of the present description. In a layer structure, when a constituent element is disposed "above" or "on" to another constituent element, the constituent element may be only directly on the other constituent element or above the other constituent elements in a non-contact manner.

The example embodiments will now be described more fully with reference to the accompanying drawings in which the example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first," "second," etc. may be used herein to describe various elements, components, regions, layers and/or sections, these elements, components, regions, layers and/or sections may not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing example embodiments only and is not intended to be limiting of the example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, the example embodiments may not be construed as limited to the shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the example embodiments.

Unless otherwise defined, all terms (including technical and scientific terms) used herein have the same meaning as commonly understood by one of ordinary skill in the art to which the example embodiments belong. It will be further understood that terms, such as those defined in commonly-used dictionaries, may be interpreted as having a meaning that is consistent with their meaning in the context of the relevant art and will not be interpreted in an idealized or overly formal sense unless expressly so defined herein.

Hereinafter, sound/vibration spectrum analyzing devices and methods of acquiring and analyzing frequency information according to the example embodiments are described in detail with reference to the accompanying drawings. Also, the width of thickness of layers or areas illustrated in the drawings may be exaggerated for convenience of explanation and clarity. Like references indicate like constituent elements in the drawings. In the following description, the "spectrum of sound and vibration" may signify a spectrum of sound and/or vibration, and "sound/vibration" may signify sound and/or vibration. Furthermore, the "sound" used in a sound spectrum, a sound detection device, etc. may denote sound, acoustics, audio, etc.

Figure 1B:
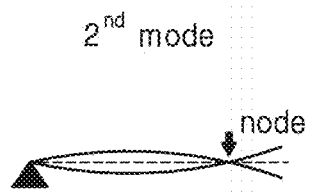

FIGS. 1A and 1B are conceptual diagrams for explaining a first resonance mode and a second resonance mode of a resonator that are applicable to a sound/vibration spectrum analyzing device according to an example embodiment. FIG. 1A illustrates a resonance behavior of a first resonance mode, and FIG. 1B illustrates a resonance behavior of a second resonance mode.

Figure 2:
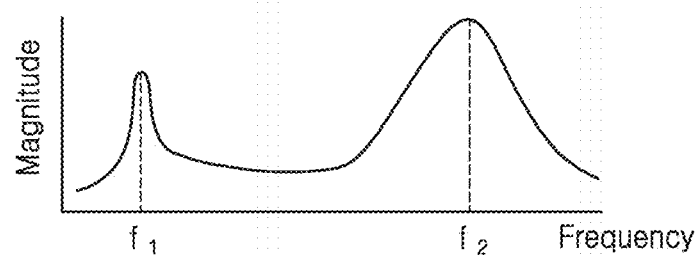
FIG. 2 is a graph showing an example of a resonance frequency of the first resonance mode and a resonance frequency of the second resonance mode of FIGS. 1A and 1B.

FIG. 2 is a graph showing an example of a resonance frequency $f_1$ of the first resonance mode and a resonance frequency $f_2$ of the second resonance mode of FIGS. 1A and 1B.

Referring to FIGS. 1 and 2, a cantilever-type resonator may have a first resonance mode (base resonance mode) and a second-order or higher resonance mode (higher-order resonance mode). The resonance frequency $f_2$ of the second resonance mode may be greater than the resonance frequency $f_1$ of the first resonance mode. A frequency interval between resonance modes and a bandwidth at each resonance point may vary according to the shape or dimensions such as an aspect ratio of a resonator. Although a resonator having a cantilever structure is illustrated and described, the shape/structure of a resonator may be changed. A resonator may have various types of electromechanical structures.

For example, in FIGS. 1A and 1B, an angular velocity $\omega_1$ of the first resonance mode and an angular velocity $\omega_2$ of second resonance mode can be expressed by the following equations.

$$\omega_1 = (1.875)^2 \sqrt{\frac{EI}{mL^4}} \quad \text{(Equation 1)}$$

$$\omega_2 = (4.694)^2 \sqrt{\frac{EI}{mL^4}} \quad \text{(Equation 2)}$$

Here, "E" denotes a Young's modulus of a resonator, "I" denotes a moment of inertia, "m" denotes mass, and "L" denotes length. In this case, a second-order resonance frequency $f_2$ may be about 6.23 times greater than the first resonance frequency $f_1$.

Figure 3:
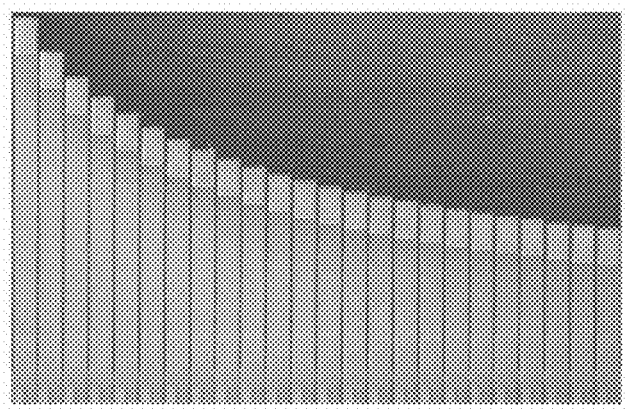
FIG. 3 is a photographic image of an example of a resonator array manufactured according to an example embodiment.

FIG. 3 is a photographic image of an example of a resonator array manufactured according to an example embodiment.

Referring to FIG. 3, a plurality of resonators for acquiring a spectrum of sound and vibration may have different central frequencies. A center frequency may signify a resonance frequency of the first resonance mode. The center frequency may vary according to the length of a resonator. Accordingly, a plurality of resonators may be designed to have different lengths. Although a case of changing the lengths of resonators is exemplified, the center frequency may be changed by changing any one or any combination of length, width, thickness, and weight.

Figure 4:
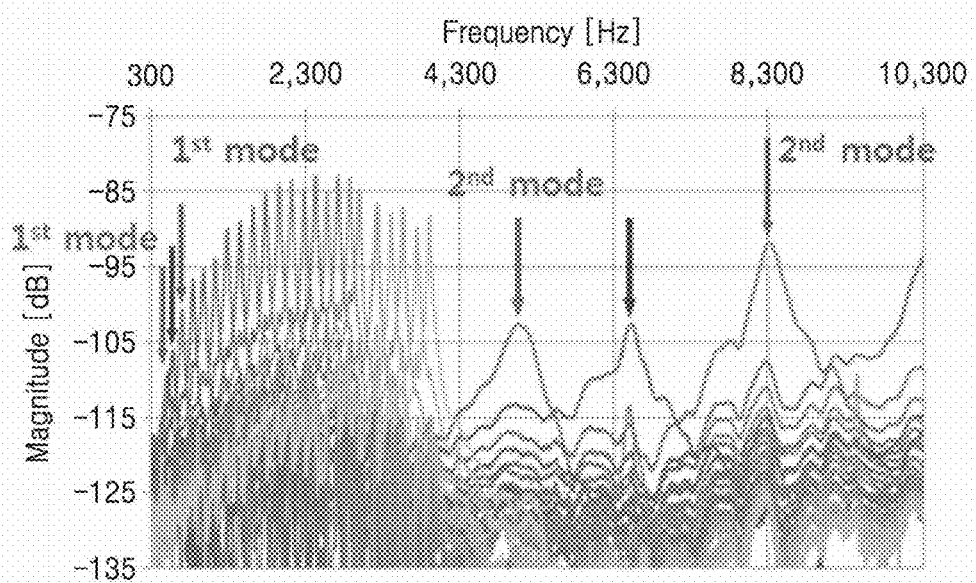
FIG. 4 is a graph showing frequency band characteristics of the resonator array of FIG. 3.

FIG. 4 is a graph showing frequency band characteristics of the resonator array of FIG. 3.

Referring to FIG. 4, it may be seen that a plurality of first resonance frequencies corresponding to the first resonance mode and a plurality of second-order resonance frequencies corresponding to the second resonance mode are generated from a plurality of resonators. The first mode resonance frequencies may be arranged at a relatively uniform interval, and the second-order mode resonance frequencies may be arranged at an interval in a frequency band higher than the first mode resonance frequencies. The magnitude (height) of the second-order mode resonance peak generated by any one resonator (corresponding resonator) of the resonators is greater than or equal to the magnitude (height) of the first mode resonance peak corresponding thereto. The bandwidth of the second-order mode resonance peak appears to be wider than that of the first mode resonance peak.

In the present example embodiment, a sound and vibration spectrum may be acquired and analyzed by using all of the characteristics of the first resonance mode and the second-order or higher resonance mode. Accordingly, two or more different frequency band filter characteristics may be simultaneously acquired from a single physical resonator. In other words, multimode frequency band characteristics may be secured from an individual resonator.

According to an example embodiment, a "band signal divider (band signal splitter)" may be used to separate a frequency signal (band signal) of the first resonance mode and a frequency signal (band signal) of the second-order or higher resonance mode. The band signal divider may include a diplexer, a duplexer, or a triplexer. The diplexer may include a low pass filter (LPF) and a high pass filter (HPF) coupled thereto. The LPF and the HPF may have the same cutoff frequency. The diplexer may be provided as a device in which the LPF and the HPF sharing one cutoff frequency are coupled to each other, or as a function corresponding thereto, or may be implemented by using an analog circuit or a digital filter. The triplexer may include an LPF, a bandpass filter, and a HPF. A band signal may be split into two signals by a diplexer and a duplexer, and into three signals by a triplexer. The triplexer may be used when all signals of the first, second-order, and third-order resonance modes are used. The band signal divider may include a plurality of bandpass filters or multi-bandpass filters.

Figure 5:
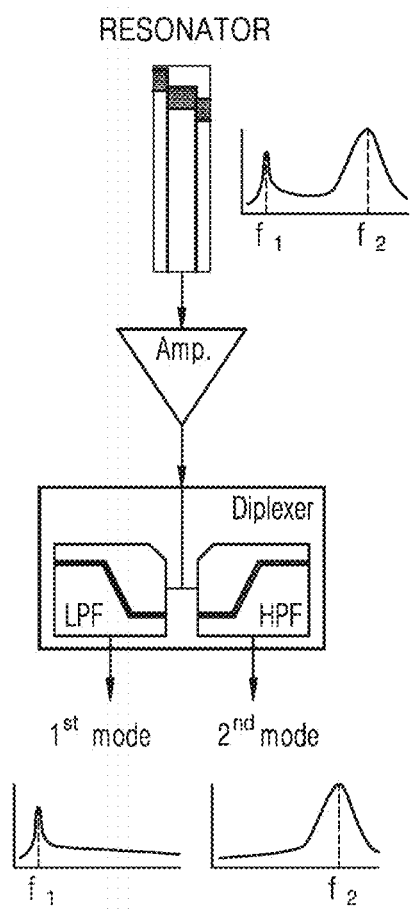
FIG. 5 is a schematic view showing a process of separating a frequency signal of a first resonance mode and a frequency signal of a second resonance mode by connecting a diplexer to a resonator.

FIG. 5 is a schematic view showing a process of separating a frequency signal of a first resonance mode and a frequency signal of a second resonance mode by connecting a diplexer to a resonator.

Referring to FIG. 5, a diplexer that is an example of a band signal divider may be connected to a resonator. The diplexer may be a device or a function in which an LPF and a HPF sharing one cutoff frequency are coupled to each other. A first resonance mode frequency signal (resonance frequency: $f_1$) and a second resonance mode frequency signal (resonance frequency: $f_2$) generated from a single physical resonator may be simultaneously separated and output by the diplexer. A sense amplifier Amp for amplifying a signal may be further provided between the resonator and the diplexer.

Using a first resonance mode signal and a second-order or higher resonance mode signal by separating the signals from each other may improve signal processing and resolution. If the first resonance mode signal and the second-order or higher resonance mode signal are not separated, the signals may be output in a mixed state, which may not improve resolution. In some cases, however, the band signal divider may not be used.

A single band signal divider may be used for a plurality of resonators by being commonly connected thereto. Alternatively, a band signal divider may be connected to each resonator one by one, or a plurality of resonators are divided into a plurality of groups, and then a band signal divider may be provided to each group.

Figure 6:
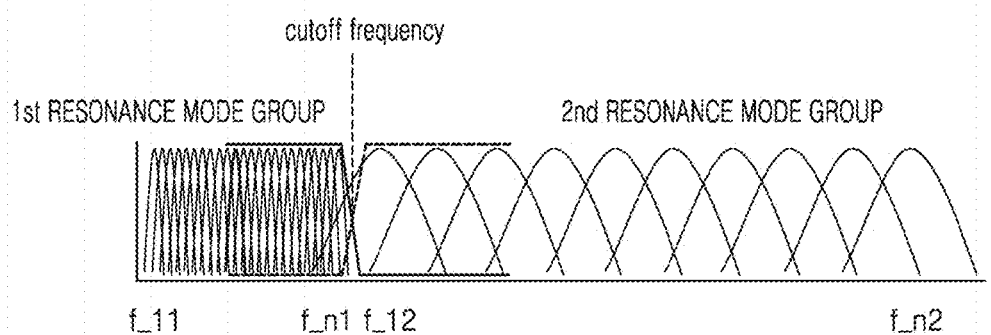
FIG. 6 is a graph showing an example of a band filter array design using first resonance modes and second resonance modes of a plurality of resonators altogether, according to an example embodiment.

FIG. 6 is a graph showing an example of a band filter array design using first resonance modes and second resonance modes of a plurality of resonators altogether, according to an example embodiment.

Referring to FIG. 6, in implementing two or more band filter characteristics from a single physical resonator, a resonance frequency group of the first resonance mode and a resonance frequency group of the second resonance mode may be designed to smoothly (naturally) connect to each other.

Assuming that a plurality of resonators includes an n number of resonators, a resonance frequency of the first resonance mode of a first resonator (lowest-frequency resonator) is f_11, and a resonance frequency of the second resonance mode of the first resonator is f_12, an arrangement may be designed such that resonance frequencies of the first resonance mode of second to n-th resonators are disposed between the resonance frequencies f_11 and f_12. In FIG. 6, "f_n1" denotes a resonance frequency of the first resonance mode of the n-th resonator, and "f_n2" denotes a resonance frequency of the second resonance mode of the n-th resonator. In this state, the cutoff frequency of a band signal divider, for example, a diplexer, may be disposed between the resonance frequency group of the first resonance mode and the resonance frequency group of the second resonance mode of a plurality of resonators.

From a total n number of physical resonators, (2×n) number of filter arrangement effects covering the entire frequency range of interest may be obtained.

Figure 7:
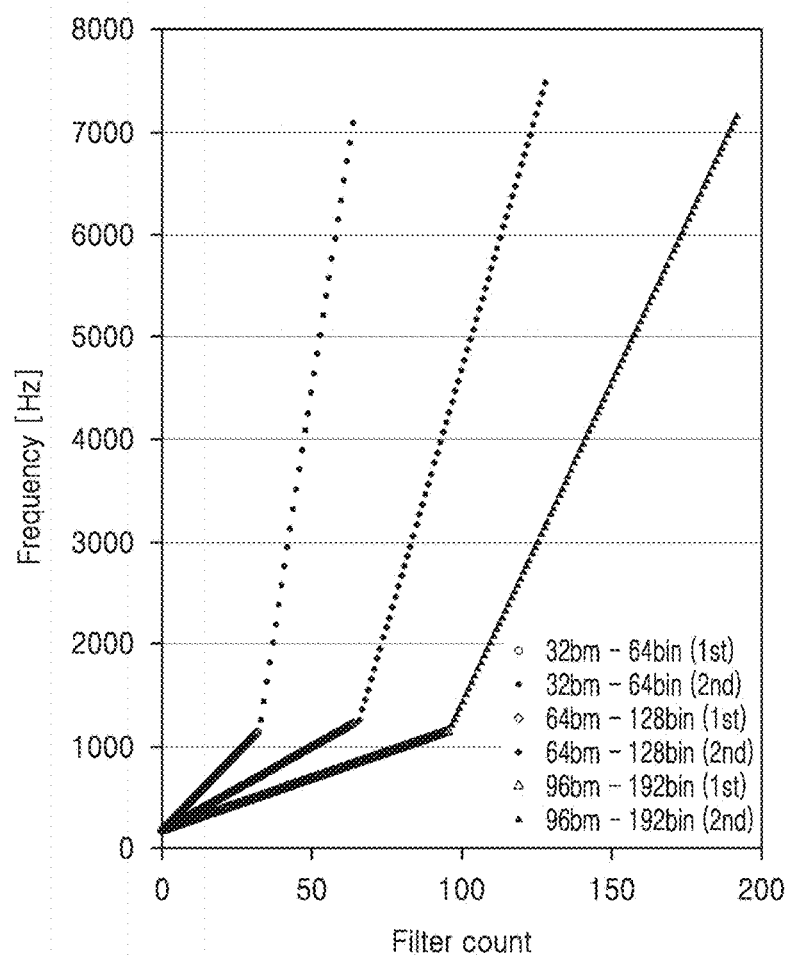
FIG. 7 is a graph showing a case in which a band filter is designed to have first and second resonance modes using a plurality of resonators.

FIG. 7 is a graph showing a case in which a band filter is designed to have the first and second resonance modes using thirty-two (32), sixty-four (64), and ninety-six (96) resonators with respect to a frequency range of about 7 kHz or less. Accordingly, a sound/vibration spectrum analyzing device capable of covering a relatively wide frequency range using a relatively less number of resonators may be implemented.

Figure 8:
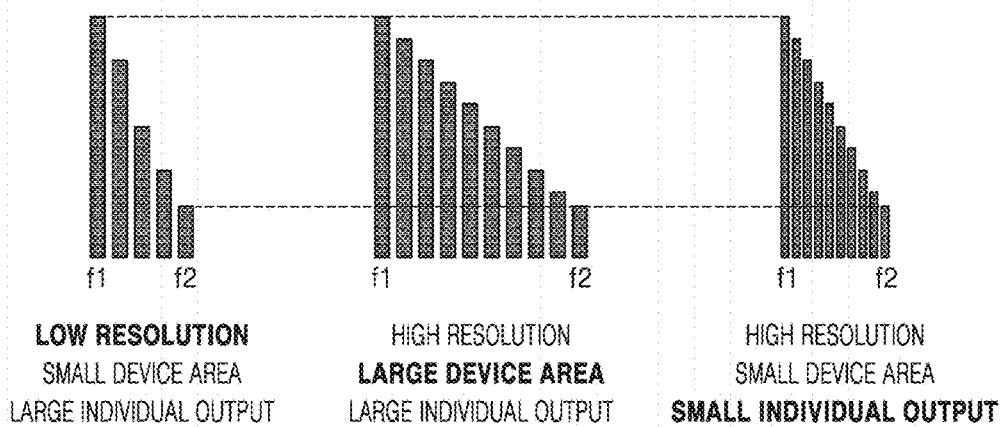
FIG. 8 is a view for explaining a relationship among a number of resonators, a frequency resolution, a device area, an output of an individual resonator in a resonator array sensor, according to a comparative example.

FIG. 8 is a view for explaining a relationship among a number of resonators, a frequency resolution, a device area, an output of an individual resonator in a resonator array sensor, according to a comparative example. The resonator array sensor according to a comparative example has a plurality of resonators, and each of the resonators has only one band filter, that is, a channel. In other words, only a first resonance mode signal is used in each resonator.

Referring to FIG. 8, because resolution of a frequency band is the same as the number of resonators, the number of resonators is increased to improve the resolution. However, when the number of resonators increases, a device area increases, and thus miniaturization is difficult, applied fields are limited, and costs are raised. Furthermore, to increase the number of resonators while maintaining a device area, the size of an individual resonator is reduced. Accordingly, output may be lowered, and design of a resonance frequency may be restricted.

Figure 9:
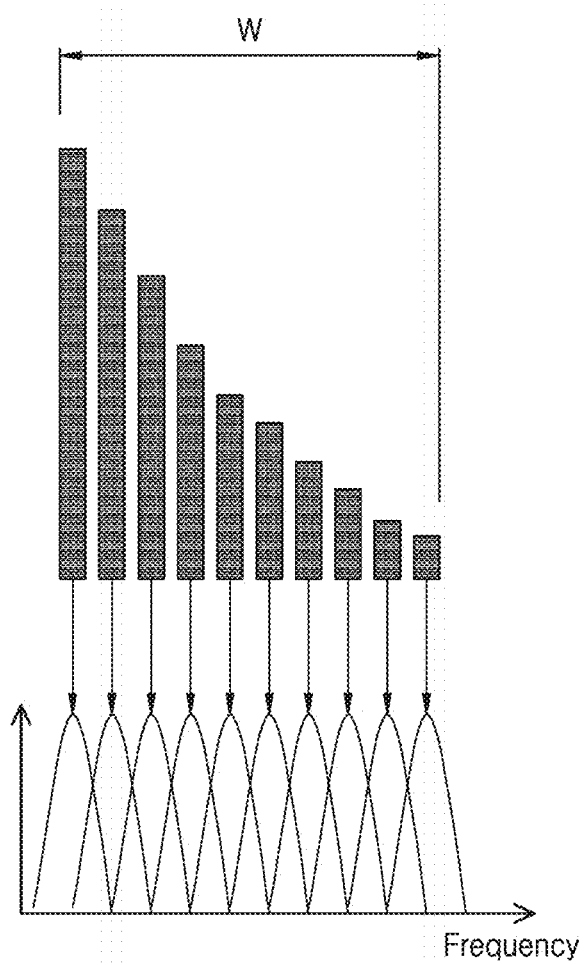
FIG. 9 is a view showing a correlationship between the resonator array sensor according to a comparative example and a resonance frequency generated therefrom.

FIG. 9 is a view showing a correlationship between the resonator array sensor according to a comparative example and a resonance frequency generated therefrom.

Referring to FIG. 9, one resonance frequency may correspond to each resonator. In this case, the number of resonators and the number of effective band filters, that is, channels, may be the same. A width of the entire device is indicated by W.

Figure 10:
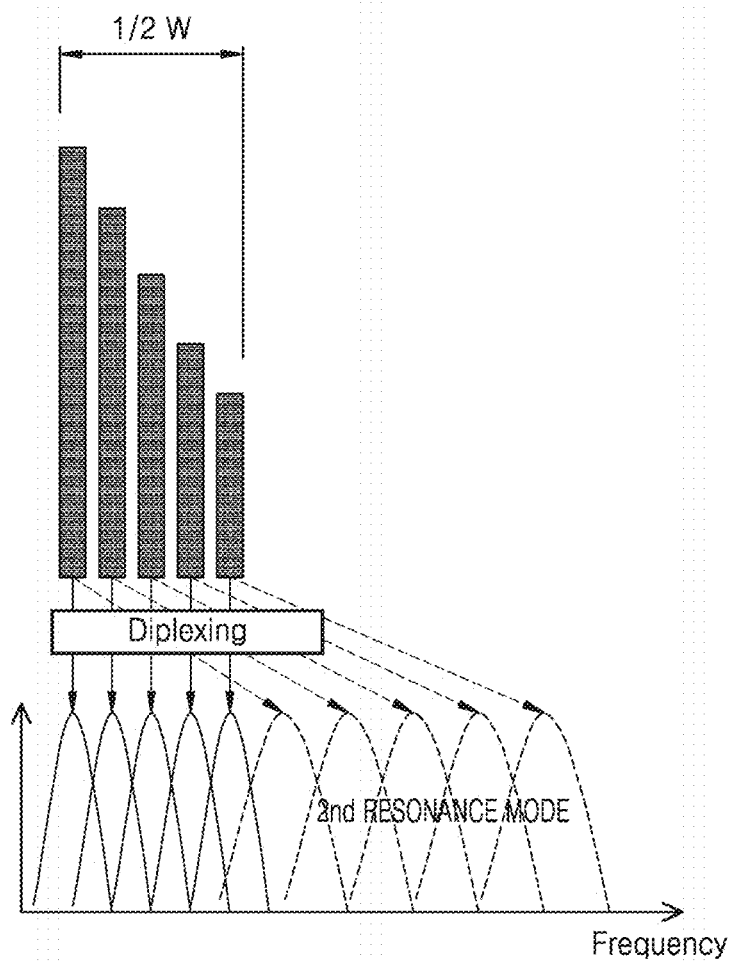
FIG. 10 is a view showing a correlationship between a resonator array sensor according to an example embodiment and a resonance frequency generated therefrom.

FIG. 10 is a view showing a correlationship between a resonator array sensor (sound/vibration spectrum analyzing device) according to an example embodiment and a resonance frequency generated therefrom.

Referring to FIG. 10, because both of the first resonance mode signal and the second resonance mode signal are used, the same number of effective band filters (channels) may be secured by using half the number of resonators compared to the comparative example of FIG. 9. While the width/area of a device is reduced to half, equal or higher performance may be secured. Furthermore, when the number of resonators is reduced by using a second-order or higher resonance mode signal, and the size of an individual resonator is increased as much as the reduced number, the output of the individual resonator may be increased.

Figure 11:
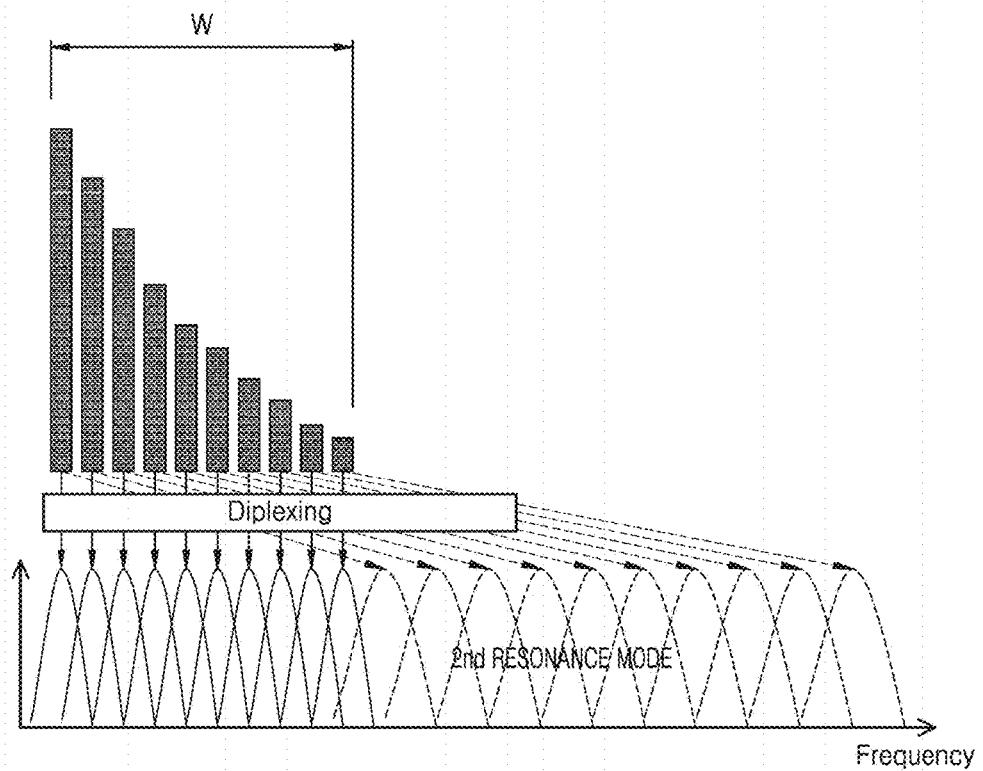
FIG. 11 is a view showing a correlationship between a resonator array sensor according to another example embodiment and a resonance frequency generated therefrom.

FIG. 11 is a view showing a correlationship between a resonator array sensor (sound/vibration spectrum analyzing device) according to another example embodiment and a resonance frequency generated therefrom.

Referring to FIG. 11, by using both of the first and second resonance modes, twice the effective frequency band filter characteristics may be secured from the same number of resonators as that in the comparative example of FIG. 9. In other words, twice the effective channel number may be secured in the device having the same area. When a third-order resonance mode frequency signal of at least some of a plurality of resonators is further used, more than twice the band filter characteristics may be obtained.

Figure 12:
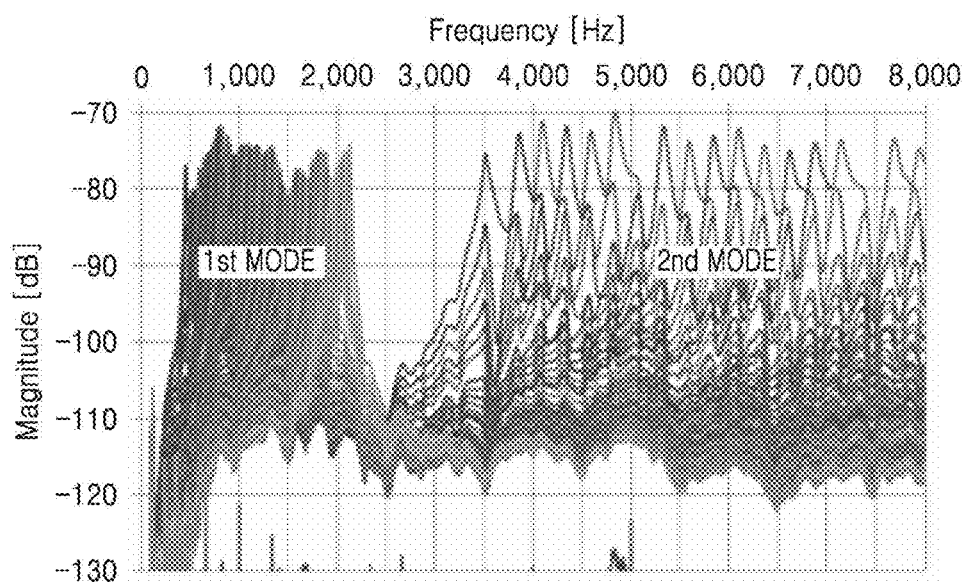
FIG. 12 is a graph showing frequency band characteristics corresponding to a sound/vibration spectrum analyzing device when a sound/vibration spectrum analyzing device using a multimode signal is manufactured by using a plurality of resonators, according to an example embodiment.
Figure 13:
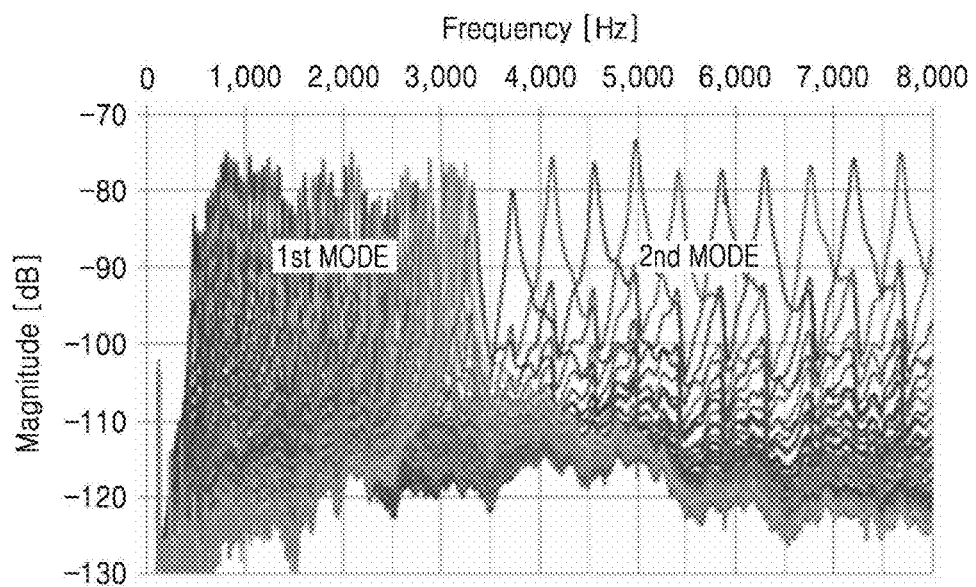
FIG. 13 is a graph showing frequency band characteristics corresponding to a sound/vibration spectrum analyzing device when a sound/vibration spectrum analyzing device using a multimode signal is manufactured by using a plurality of resonators, according to another example embodiment.

FIGS. 12 and 13 are graphs showing frequency band characteristics corresponding to a sound/vibration spectrum analyzing device when a sound/vibration spectrum analyzing device using a multimode signal is manufactured by using a plurality of resonators (sixty-four (64) resonators), according to example embodiments.

FIG. 12 illustrates a case in which an interval between the resonance frequencies of the first resonance mode is relatively narrow. FIG. 13 illustrates a case in which an interval between the resonance frequencies of the first resonance mode is relatively wide. When, as illustrated in FIG. 12, the interval between the resonance frequencies of the first resonance mode is narrow, a loss band may exist between a first resonance mode group and a second resonance mode group. However, in the case of FIG. 13, it may be seen that the first resonance mode group and the second resonance mode group are appropriately connected without a loss band therebetween.

Assuming that a plurality of resonators include an n number of resonators, the resonance frequency of the first resonance mode of an n-th resonator (maximum frequency resonator) is $f\_n1$, the resonance frequency of the second resonance mode of a first resonator (minimum frequency resonator) is $f\_12$, and the resonance frequency of the second resonance mode of a second resonator is $f\_22$, $[(f\_12)-(f\_n1)]$ may be less than or equal to a value equivalent to about twice $[(f\_22)-(f\_12)]$. However, this is an example, and embodiments are not limited thereto. The above condition may not be satisfied according to the purpose and type of a device.

In the example embodiments of FIGS. 12 and 13, the resonance frequencies of the first resonance mode of a plurality of resonators may be linearly arranged at the same interval. In this case, the resonance frequencies of the second resonance mode may be linearly arranged at the same interval. The term "same interval" may be a concept including an approximate and substantial identical interval. In another example embodiment, the resonance frequencies of the first resonance mode of a plurality of resonators may be non-linearly arranged so that the interval may be changed. An example thereof is illustrated in FIG. 14.

Figure 14:
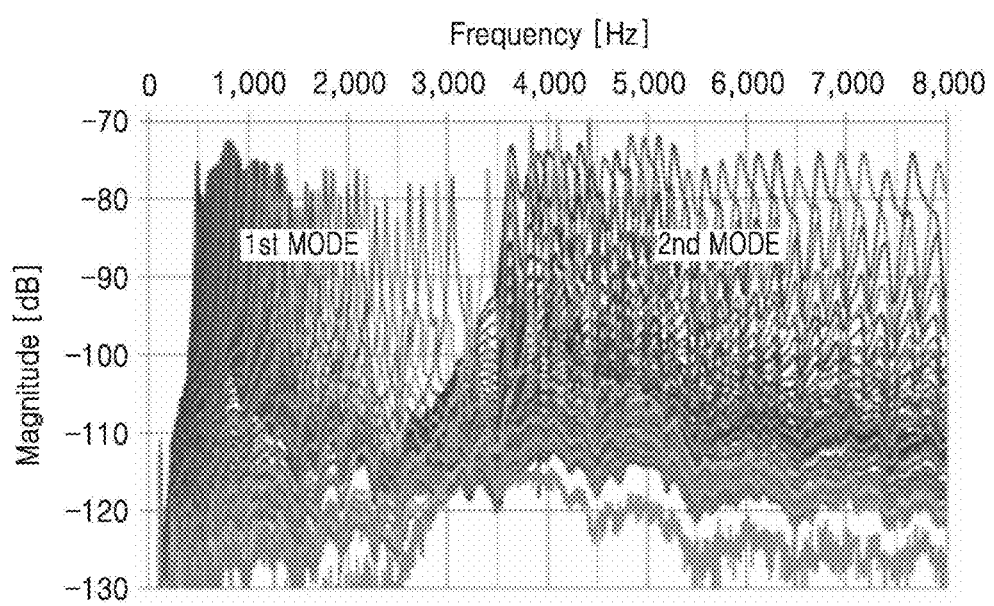
FIG. 14 is a graph showing a case in which a resonance frequency interval of a first resonance mode of a plurality of resonators is changed.

FIG. 14 is a graph showing a case in which a resonance frequency interval of the first resonance mode of a plurality of resonators is changed. Referring to FIG. 14, the resonance frequencies of the first resonance mode may be non-linearly arranged to have a tendency that an interval gradually increases toward the right side in the drawing, that is, in a direction in which the frequency increases. The resonance frequencies of the second resonance mode having a similar tendency may be non-linearly arranged. The resonance characteristics of each resonator may be controlled by changing any one or any combination of the length, width, thickness, and weight of the resonators.

A plurality of resonators applied to the sound/vibration spectrum analyzing devices according to the example embodiments may have an electromechanical structure having a microscale or lower. The resonators may be manufactured in a microelectromechanical system (MEMS) process. Furthermore, each of the resonators may have a cantilever structure with one fixed end or a structure in which both ends are fixed. Furthermore, each of the resonators may a vibration portion (movable portion) of a flexible rod type and a mass body provided on the vibration portion (movable portion). The resonance characteristics of a resonator may be controlled according to the dimensions, weight, etc. of the vibration portion and the mass body.

According to an additional example embodiment, a plurality of resonators may include first and second resonators, and the first and second resonators may have the same resonance frequency of the first resonance mode and different resonance frequencies of the second resonance mode. This may be possible by adjusting the structure, dimensions, etc. of the first and second resonators. An example thereof is described with reference to FIGS. 15 and 16.

Figure 15A:
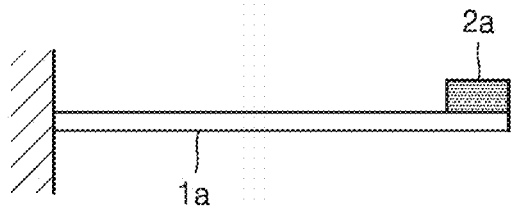
FIGS. 15A and 15B are cross-sectional views showing examples of structures of two resonators.
Figure 15B:
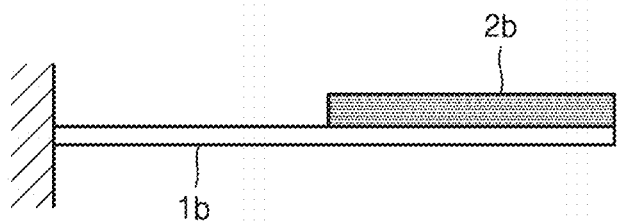

FIGS. 15A and 15B are cross-sectional views showing examples of structures of two resonators. FIG. 15A illustrates a first resonator including a first vibration portion (movable portion) 1a of a rod type and a first mass body 2a provided on one end thereof. FIG. 15B illustrates a second resonator including a second vibration portion 1b and a second mass body 2b. The first mass body 2a is relatively light (light mass), and the second mass body 2b is relatively heavy (heavy mass). The length of a flexible area in the first vibration portion 1a is relatively long (long flexure), and the length of a flexible area in the second vibration portion 1b is relatively short (short flexure).

Figure 16A:
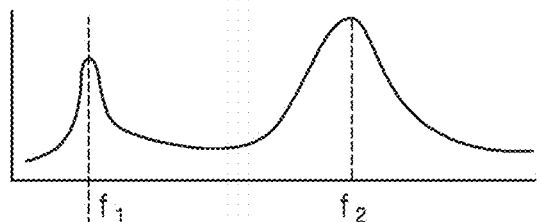
FIGS. 16A and 16B are graphs for explaining a first resonance frequency and a second resonance frequency generated by the respective resonators of FIG. 15.
Figure 16B:
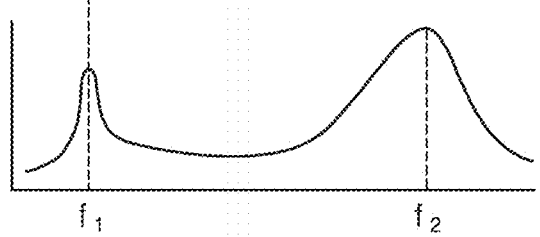

FIGS. 16A and 16B are graphs for explaining a first resonance frequency $f_1$ and a second resonance frequency $f_2$ respectively generated by the first and second resonators of FIG. 15. The graph of FIG. 16A shows a result with respect to the first resonator of FIG. 15A, and the graph of FIG. 16B shows a result with respect to the second resonator of FIG. 15B. Referring to FIG. 16, the first resonance frequency $f_1$ of the first resonator may be the same as or substantially the same as the first resonance frequency $f_1$ of the second resonator. The second resonance frequency $f_2$ of the first resonator may be different from the second resonance frequency $f_2$ of the second resonator. The second resonance frequency $f_2$ of the second resonator may be greater than the second resonance frequency $f_2$ of the first resonator. For example, the second resonance frequency $f_2$ of the first resonator may be about seven (7) times greater than the first resonance frequency $f_1$ of the first resonator. The second resonance frequency $f_2$ of the second resonator may be about twelve (12) times greater than the first resonance frequency $f_1$ of the second resonator. As such, a relative magnitude, that is, an interval therebetween, of the second-order resonance frequency with respect to the first resonance frequency may be adjusted by controlling the structure/shape and dimensions of a resonator.

In the following description, the methods of acquiring and analyzing frequency information, that is, the methods of acquiring and analyzing a sound/vibration spectrum, according to the example embodiments, are briefly described. The methods of analyzing sound/vibration spectrum according to the example embodiments are understood in association with the structures and principles of the sound/vibration spectrum analyzing devices described with reference to FIGS. 1 to 16.

According to an example embodiment, a method of analyzing a sound/vibration spectrum using a plurality of resonators having different center frequencies may include acquiring a frequency signal of a first resonance mode of at least some of the resonators, acquiring a frequency signal of a second resonance mode of the at least some of the resonators, and analyzing each of the frequency signal of the first resonance mode and the frequency signal of the second resonance mode.

The analysis method may further include separating the frequency signal of the first resonance mode and the frequency signal of the second resonance mode of the at least some of the resonators. In this case, at least one individual resonator of the resonators may simultaneously output a frequency signal of the first resonance mode and a frequency signal of the second resonance mode separated from the frequency signal of the first resonance mode. Furthermore, the analysis method may further include acquiring and analyzing a frequency signal of a third-order or higher resonance mode of the at least some of the resonators.

According to example embodiments, an arrangement method of a plurality of resonators or the structure, dimensions, etc. of each resonator may be changed in various ways. In the following description, examples of the arrangement of a plurality of resonators and the structure of a resonator are described with reference to FIGS. 17 to 27.

Figure 17:
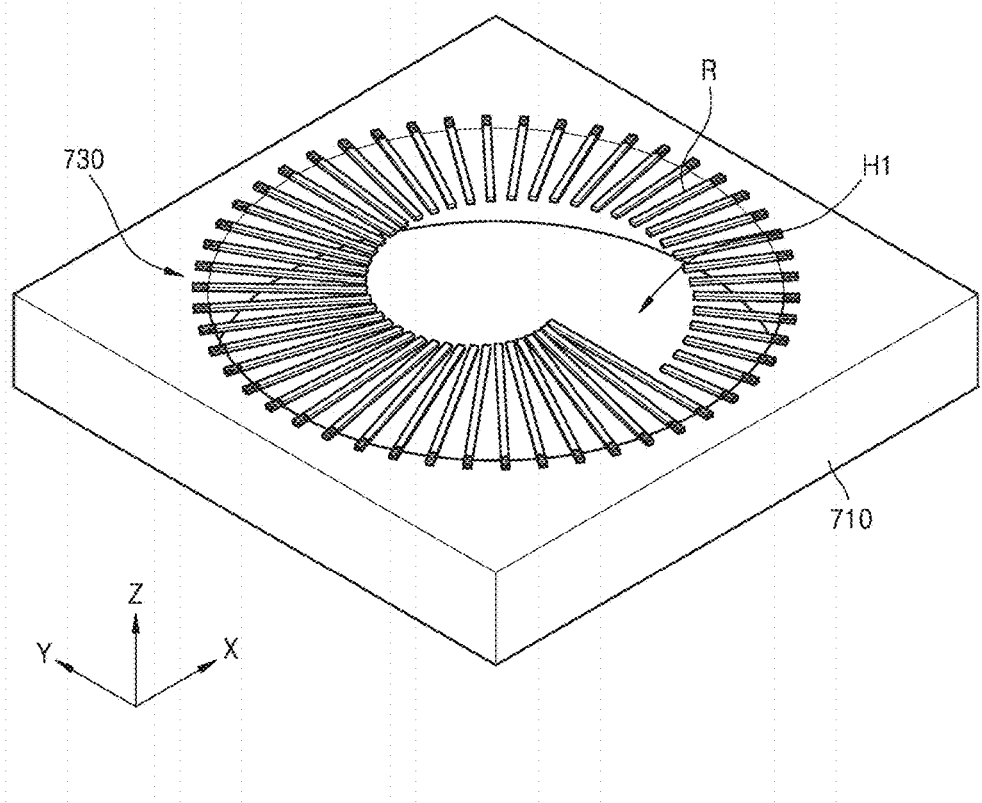
FIG. 17 is a schematic perspective view of a structure of a sound/vibration spectrum analyzing device according to an example embodiment.

FIG. 17 is a schematic perspective view of a structure of a sound/vibration spectrum analyzing device according to an example embodiment.

Referring to FIG. 17, the sound/vibration spectrum analyzing device according to the present example embodiment may include a support substrate 710 and a resonator array 730 provided thereon. A through-hole H1 may be formed in the support substrate 710. The resonator array 730 may be arranged on the support substrate 710 in an area around the through-hole H1. The resonator array 730 may include a plurality of resonators R having different center frequencies. The resonators R each may have a structure in which any one or any combination of the length, width, thickness, and weight thereof is different from the other. In the present example embodiment, at least some of the resonators R have different lengths. The resonators R may extend to the inside of the through-hole H1 by surrounding an area of the through-hole H1. The through-hole H1 may provide a space in which the resonators R vibrate. Although the through-hole H1 is illustrated to be circular, the present disclosure is not limited thereto and the through-hole H1 may have a polygonal shape or various other closed-curve shapes. The resonators R each may have a width of about several micrometers or less, a thickness of about several micrometers or less, and a length of about several millimeters or less. The resonators R may be manufactured in an MEMS process. The resonators R may vibrate in a vertical direction in the Z-axis direction in response to an external signal.

Figure 18:
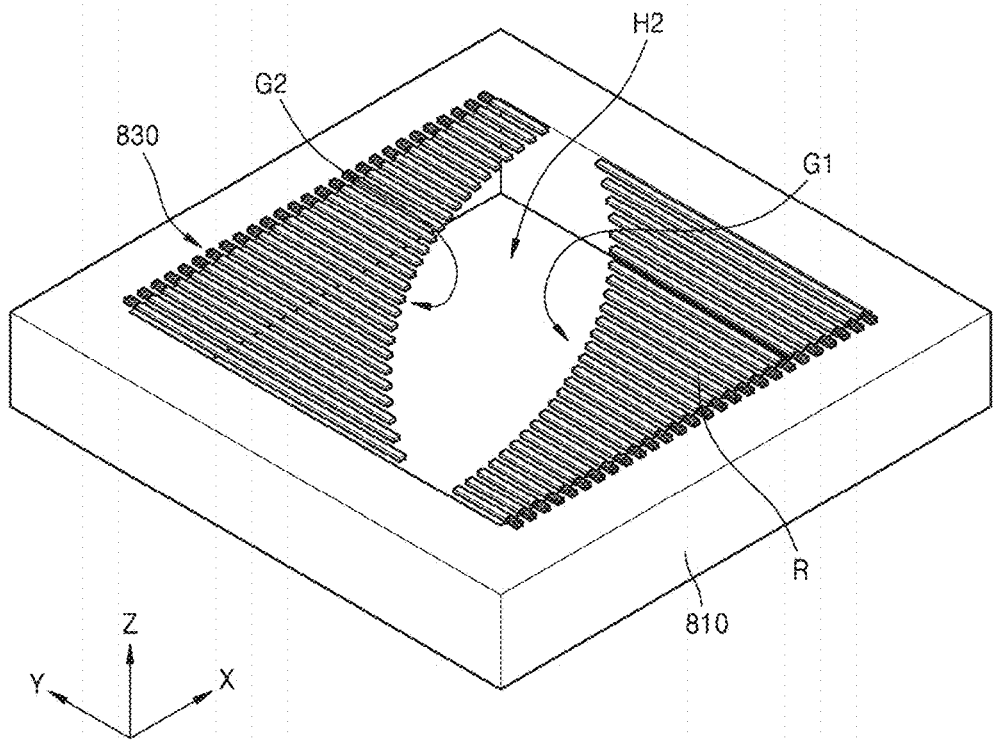
FIG. 18 is a schematic perspective view of a structure of a sound/vibration spectrum analyzing device according to another example embodiment.

FIG. 18 is a schematic perspective view of a structure of a sound/vibration spectrum analyzing device according to another example embodiment.

Referring to FIG. 18, the sound/vibration spectrum analyzing device according to the present example embodiment may include a support substrate 810 in which a rectangular through-hole H2 is formed, and a resonator array 830 provided thereon. The resonator array 830 may be divided into a plurality of groups G1 and G2. The resonators R of a first group G1 and the resonators R of a second group G2 may face each other. The lengths of the resonators R of the first group G1 may increase in a first direction, whereas the lengths of the resonators R of the second group G2 may increase in a direction opposite to the first direction. Accordingly, due to the arrangement structure, a space occupied by all the resonators R may be reduced.

A "band signal divider" connected to the resonators R of FIGS. 17 and 18 may be further provided. The band signal divider may include, for example, a diplexer, a duplexer, or a triplexer.

Figure 19:
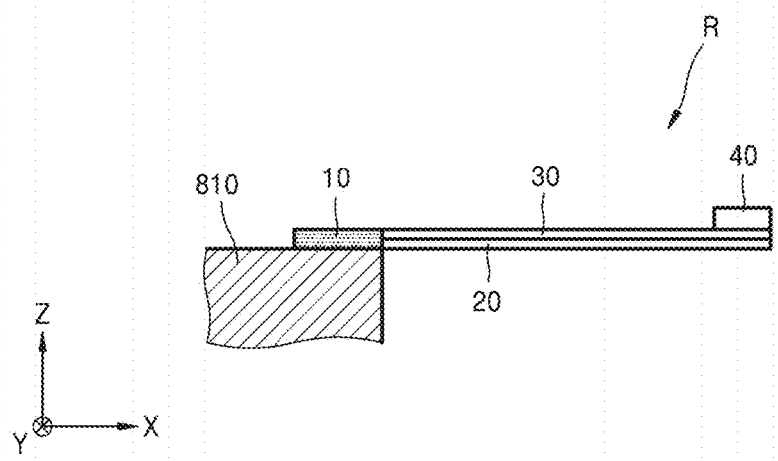
FIG. 19 is a cross-sectional view of an example of a resonator structure applicable to FIGS. 17 and 18.

FIG. 19 is a cross-sectional view of an example of a structure of one of the resonators R applicable to FIGS. 17 and 18.

Referring to FIG. 19, the resonator R may include a fixed portion 10 fixed to the support substrate 810, a movable portion 20 moving in response to a sound/vibration signal, and a sensing portion 30 sensing a movement of the movable portion 20. The sensing portion 30 may vibrate with the movable portion 20. Accordingly, it may be said that the movable portion 20 and the sensing portion 30 constitute one "vibration portion (movable portion)." Additionally, the resonator R may further include a mass body 40 to provide an amount of mass to the movable portion 20.

The movable portion 20 may be formed of an elastic film. The elastic film may have a width and a length greater than the width. The length and width of the elastic film may be factors for determining the resonance characteristics of the resonators R, with the mass of the mass body 40. Silicon, metal, polymer, etc. may be used as a material of the elastic film.

The sensing portion 30 may include a sensing layer for sensing a movement of the movable portion 20. The sensing portion 30 may include, for example, a piezoelectric device. In this case, the sensing portion 30 may have a structure in which a first electrode layer, a piezoelectric material layer, and a second electrode layer are stacked. A material, that is, a piezoelectric material, of a piezoelectric material layer may include ZnO, SnO, lead zirconate titanate (PZT), $ZnSnO_3$, polyvinylidene fluoride (PVDF), poly(vinylidene fluoride-trifluoroethylene) (P(VDF-TrFE)), AlN, lead magnesium niobate-lead titanate (PMN-PT), etc. As the first and second electrode layers, metal or a metal compound material, or various other conductive materials may be used.

Figure 20:
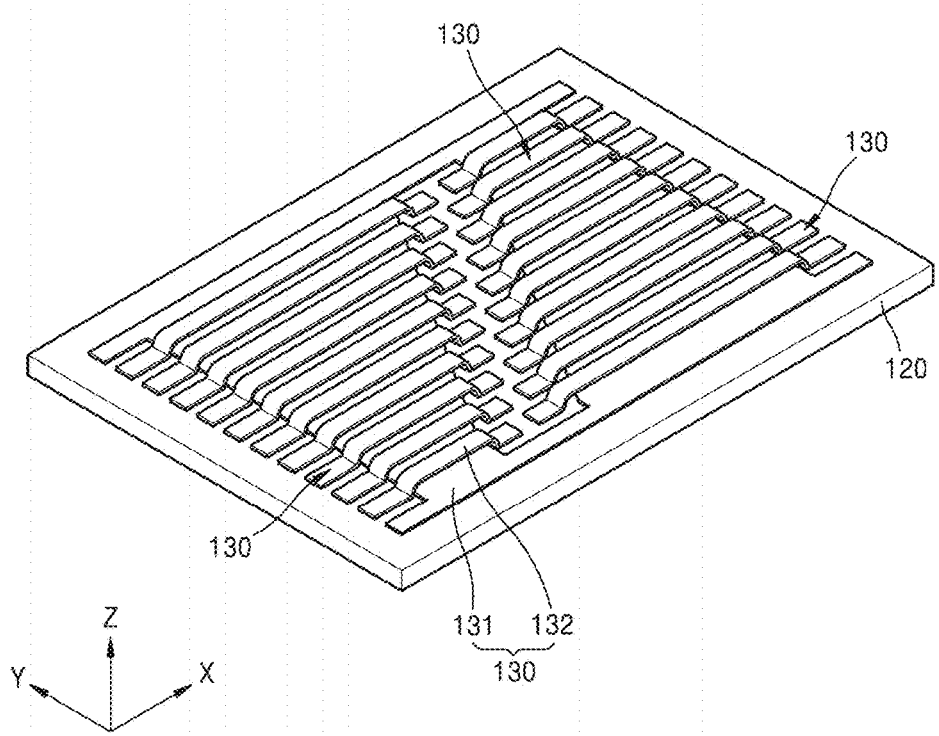
FIG. 20 is a perspective view of a resonator array of a sound/vibration spectrum analyzing device according to another example embodiment.
Figure 21:
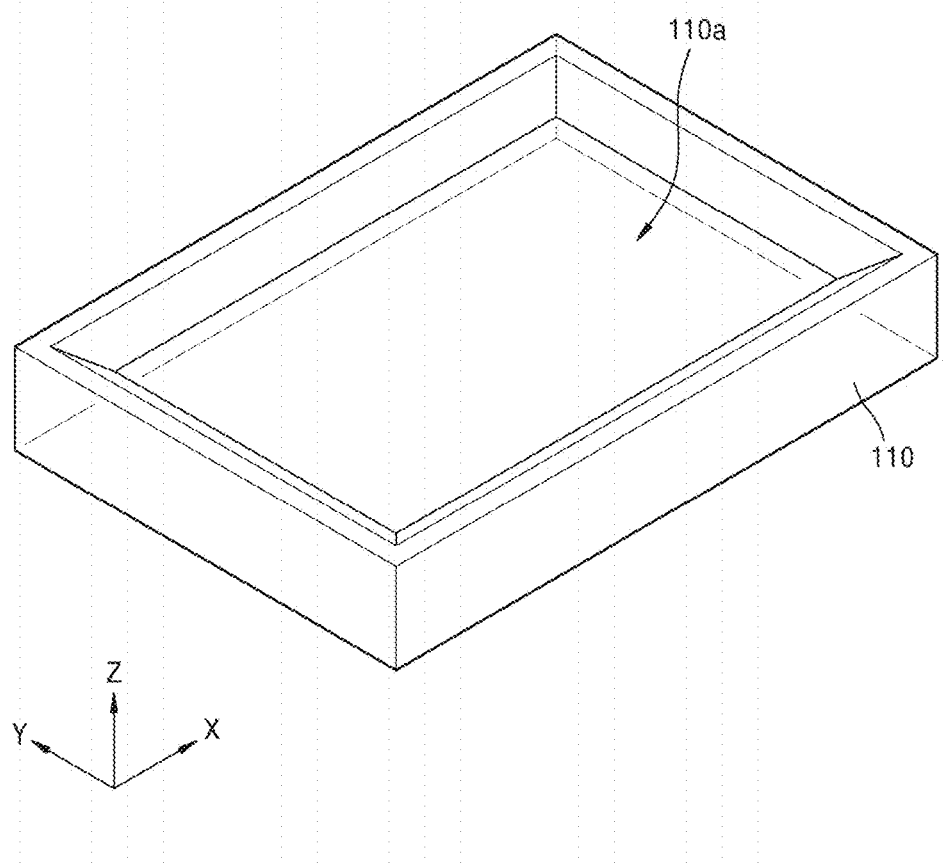
FIG. 21 is a perspective view of a structure of a substrate in which the resonator array of FIG. 20 is arranged.
Figure 22:
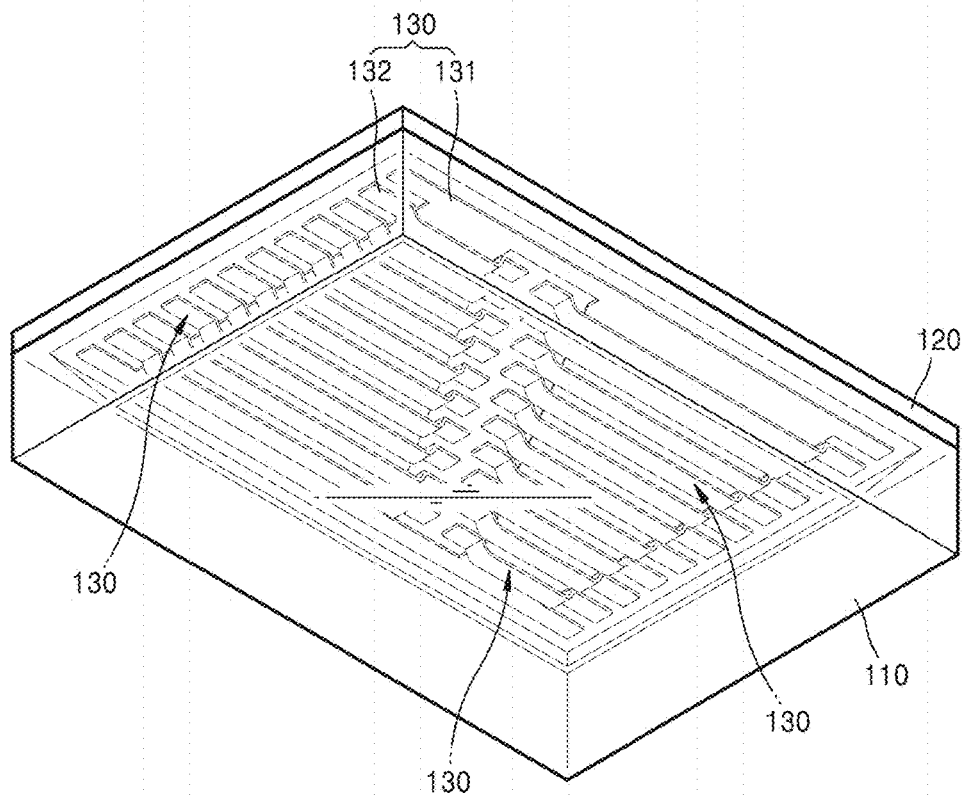
FIG. 22 is a perspective view of a resultant of a combination of the resonator array of FIG. 20 to the substrate of FIG. 21.

FIG. 20 is a perspective view of a resonator array of a sound/vibration spectrum analyzing device according to another example embodiment. FIG. 21 is a perspective view of a structure of a substrate in which the resonator array of FIG. 20 is arranged. FIG. 22 is a perspective view of a resultant of combining the resonator array of FIG. 20 to the substrate of FIG. 21. FIG. 22 is a perspective view viewed from the bottom of a substrate 110.

Referring to FIGS. 20 to 22, the sound/vibration spectrum analyzing device may include the substrate 110, a membrane 120, and a plurality of resonators 130. A silicon substrate, for example, may be used as the substrate 110, but the present disclosure is not limited thereto and various other materials may be used therefor. A cavity 110a may be formed to a depth in one surface of the substrate 110.

The resonators 130 may be arranged on the membrane 120. The membrane 120 may be arranged on a surface of the substrate 110, covering the cavity 110a. In this state, the resonators 130 may be arranged inside the cavity 110a. The inside of the cavity 110a may be kept in a vacuum. The inside of the cavity 110a may be maintained at a pressure lower than the atmosphere, for example, a degree of vacuum of about 100 Torr or less, in detail, about 1000 mTorr or less, but the present disclosure is not limited thereto. Although the membrane 120 may include, for example, silicon, a silicon oxide, a silicon nitride, metal, or a polymer, this is an example and various other materials may be used therefor.

The membrane 120 may be provided to receive a sound signal of a wideband. For example, although the membrane 120 may be provided to receive a sound signal of an audible frequency band ranging from about 20 Hz to about 20 kHz, the present disclosure is not limited thereto. The membrane 120 may be provided to receive a sound/vibration signal of an ultrasonic band of about 20 kHz or more or an infrasonic band of about 20 Hz or less.

The resonators 130 may be arranged in a form on a surface of the membrane 120. The resonators 130 may be provided on an inner surface of the membrane 120 facing the cavity 110a formed in the substrate 110 to be located inside the cavity 110a that is maintained in a vacuum. As such, when a periphery is maintained in a vacuum, a Q-factor (Quality factor) of the resonators 130 may be improved. The resonators 130 may be provided to sense sound/vibration frequencies of different bands. To this end, at least some of the resonators 130 may have different dimensions. For example, at least some of the resonators 130 may have different lengths, widths, or thicknesses. Although the number of resonators 130 provided on the membrane 120 may be, for example, several tens to thousands, the present disclosure is not limited thereto and the number of resonators 130 may be variously changed according to design conditions.

Each of the resonators 130 may have a structure capable of sensing vibration in an electrostatic method. Each of the resonators 130 may include a first electrode 131 provided on the membrane 120 and a second electrode 132 arranged to face the first electrode 131. The second electrode 132 includes a plurality of second electrodes 132 having different lengths that are provided spaced apart from the first electrode 131. Both ends of each of the second electrodes 132 may be fixed to the membrane 120. The first and second electrodes 131 and 132 may include a conductive material, for example, metal or an alloy exhibiting excellent electric conductivity. However, the present disclosure is not limited thereto, and the first and second electrodes 131 and 132 may include a transparent conductive material such as an indium tin oxide (ITO).

The first electrode 131 may be provided on the inner surface of the membrane 120 contacting the cavity 110a. The first electrode 131 may be a common electrode. Unlike the above, the first electrode 131 may be an individual electrode provided corresponding to the second electrode 132. The second electrode 132 arranged spaced apart from the first electrode 131 may have a width of about several micrometers or less, a thickness of about several micrometers or less, and a length of about several millimeters or less.

In the resonators 130 configured as above, when the second electrode 132 vibrates according to the movement of the membrane 120, an interval between the first and second electrodes 131 and 132 changes, and accordingly, capacitance between the first and second electrodes 131 and 132 is changed. An electrical signal from the first and second electrodes 131 and 132 may be sensed based on the change in capacitance. As a result, each of the resonators 130 may sense a sound/vibration frequency of a band. The frequency band that the resonators 130 may sense may be determined based on the dimensions, for example, lengths, of the resonators 130.

A "band signal divider" connected to the resonators 130 may be further provided. The band signal divider may include, for example, a diplexer, a duplexer, or a triplexer.

Figure 23:
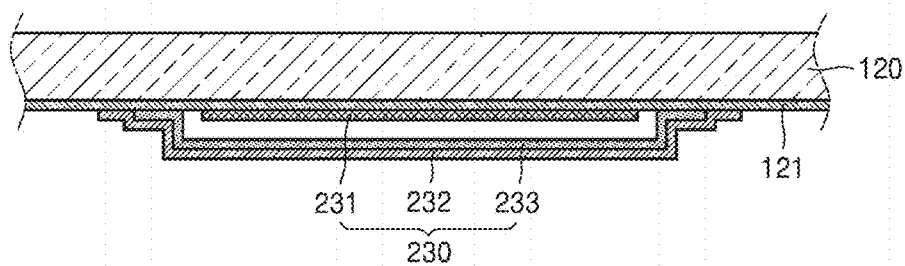
FIG. 23 is a cross-sectional view of a structure of a resonator according to another example embodiment.

FIG. 23 is a cross-sectional view of a structure of a resonator 230 according to another example embodiment.

Referring to FIG. 23, the resonator 230 may be an electrostatic resonator provided on the membrane 120. A first insulating layer 121 may be further formed on the inner surface of the membrane 120, where the resonator 230 is provided. When the membrane 120 includes a conductive material, the first insulating layer 121 insulates the resonator 230 from the membrane 120. When the membrane 120 is formed of an insulating material, the first insulating layer 121 may not be formed.

The resonator 230 may include first and second electrodes 231 and 232 provided spaced apart from each other, and a second insulating layer 233 provided on a surface where the second electrode 232 faces the first electrode 231. Although FIG. 23 illustrates an example in which the second insulating layer 233 is formed only on the second electrode 232, the second insulating layer 233 may be formed on the first electrode 231 or on the first and second electrodes 231 and 232. The resonator 230 may be manufactured in a fine size by an MEMS process.

Figure 24:
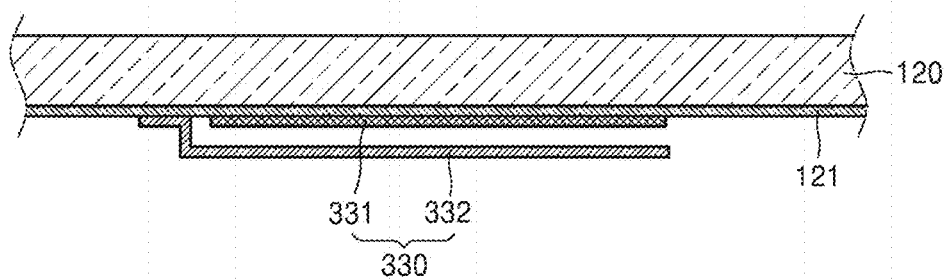
FIG. 24 is a cross-sectional view of a structure of a resonator according to another example embodiment.

FIG. 24 is a cross-sectional view of a structure of a resonator 330 according to another example embodiment.

Referring to FIG. 24, the first insulating layer 121 is formed on the inner surface of the membrane 120, where the resonator 330 is provided. One end of a second electrode 332 provided spaced apart from a first electrode 331 is fixed to the membrane 120, whereas the other end of the second electrode 332 may be spaced apart from the first electrode 131 without being fixed to the membrane 120. Accordingly, the resonator 330 may have a cantilever structure.

Figure 25:
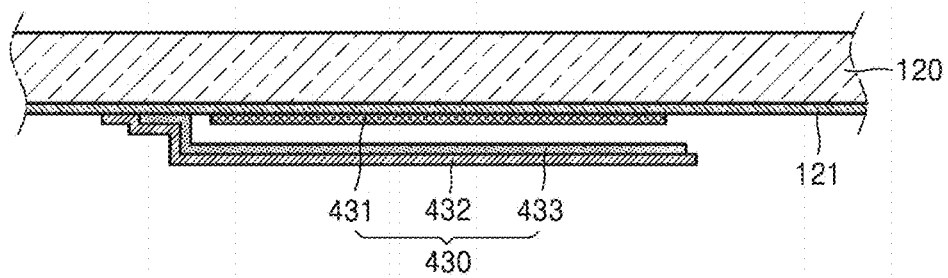
FIG. 25 is a cross-sectional view of a structure of a resonator according to another example embodiment.

FIG. 25 is a cross-sectional view of a structure of a resonator 430 according to another example embodiment.

Referring to FIG. 25, unlike the resonator 230 illustrated in FIG. 23, in the resonator 430, one end of a second electrode 432 and one end of a second insulating layer 433 are fixed to the membrane 120, and the other ends thereof may be spaced apart from a first electrode 431 without being fixed to the membrane 120.

Figure 26:
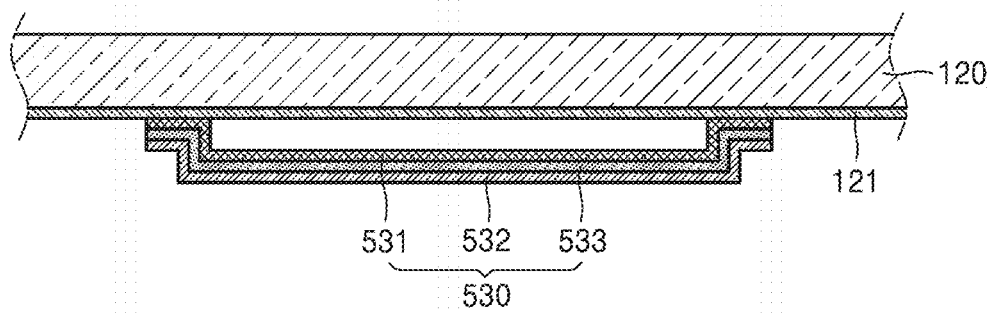
FIG. 26 is a cross-sectional view of a structure of a resonator according to another example embodiment.

FIG. 26 is a cross-sectional view of a structure of a resonator 530 according to another example embodiment.

Referring to FIG. 26, the resonator 530 may be a piezoelectric resonator provided on the membrane 120. The resonator 530 may include first and second electrodes 531 and 532 provided spaced apart from each other and a piezoelectric layer 533 provided between the first and second electrodes 531 and 532. Both ends of the first electrode 531 are fixed to the inner surface of the membrane 120, and a central portion of the first electrode 531 may be spaced apart from the membrane 120. The piezoelectric layer 533 may include a piezoelectric material capable of generating electric energy through deformation.

In the resonator 530 configured as above, when the resonator 530 vibrates according to the movement of the membrane 120, the piezoelectric layer 533 provided between the first and second electrodes 531 and 532 is deformed. An electrical signal from the first and second electrodes 531 and 532 may be sensed based on the deformation of the piezoelectric layer 533. Accordingly, the resonator 530 may selectively sense a sound/vibration frequency of a band. A frequency band to be sensed by the resonator 530 may be adjusted by the length, width, or thickness of the resonator 530.

Figure 27:
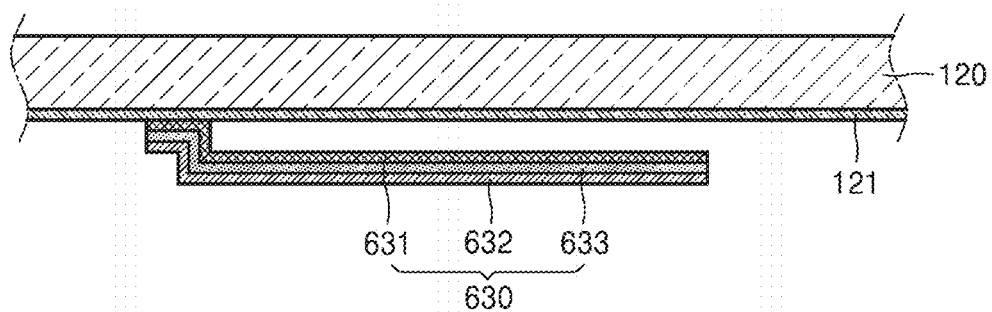
FIG. 27 is a cross-sectional view of a structure of a resonator according to another example embodiment.

FIG. 27 is a cross-sectional view of a structure of a resonator 630 according to another example embodiment.

Referring to FIG. 27, in the resonator 630, unlike the resonator 530 of FIG. 26, one end of a first electrode 631, one end of a second electrode 632, and one end of a piezoelectric layer 633 are fixed to the membrane 120, whereas the other ends thereof may be spaced apart from the membrane 120 without being fixed to the membrane 120.

When the resonator 630 has a cantilever structure, as described with reference to FIG. 1, vibration by the first resonance mode and vibration by the second-order or higher resonance mode may occur. Furthermore, when both ends of a resonator are fixed and a central portion thereof vibrates, vibration by the first resonance mode and vibration by the second-order or higher resonance mode may occur. In this case, an aspect of vibration of the central portion of a resonator may be different in the first and second resonance modes. In addition, in a single resonator, vibration by a resonance frequency of the first resonance mode and vibration by a resonance frequency of the second resonance mode may be generated independently of each other, or may be generated at the same time.

The arrangement and structure of the resonators described with reference to FIGS. 17 to 27 are examples, and may be changed in various ways. Various arrangement shapes and various resonator structures are possible.

The above-described sound/vibration spectrum analyzing devices and analysis methods according to the example embodiments may be applied to a variety of fields. For example, the sound/vibration spectrum analyzing devices may be implemented by a chip-type acoustic sensor and may be applied to speech recognition, speaker recognition, situation recognition, etc. in the environments of mobile phones, computers, home appliances, vehicles, and smart homes. Furthermore, the sound/vibration spectrum analyzing device may be implemented by a chip-type vibration sensor and may be used to analyze vibration information by being mounted on buildings, vehicles, home appliances, etc. Furthermore, the sound/vibration spectrum analyzing devices may be used for fields of reducing or removing noise, or improving call quality. In addition, the sound/vibration spectrum analyzing devices may be applied to a variety of fields such as hearing aids, safety and security, etc.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

It may be understood that the example embodiments described herein may be considered in a descriptive sense only and not for purposes of limitation. Descriptions of features or aspects within each example embodiment may be considered as available for other similar features or aspects in other example embodiments.

While the example embodiments have been described with reference to the figures, it will be understood by those of ordinary skill in the art that various changes in form and details may be made therein without departing from the spirit and scope as defined by the following claims.

What is claimed is:

1. A sound and vibration spectrum analyzing device comprising:

17 a plurality of resonators having different center frequencies, the plurality of resonators being configured to acquire a spectrum of sound and vibration, wherein the sound and vibration spectrum analyzing device is configured to analyze the spectrum of sound and vibration, based on a first frequency signal of a first resonance mode and a second frequency signal of a second-order or higher resonance mode of at least some of the plurality of resonators.

2. The sound and vibration spectrum analyzing device of claim 1, further comprising a band signal divider that separates the first frequency signal of the first resonance mode and the second frequency signal of the second-order or higher resonance mode of the at least some of the plurality of resonators.

3. The sound and vibration spectrum analyzing device of claim 2, wherein the band signal divider comprises one of a diplexer, a duplexer, and a triplexer.

4. The sound and vibration spectrum analyzing device of claim 2, wherein the band signal divider comprises a low pass filter and a high pass filter, and each of the low pass filter and the high pass filter has a same cutoff frequency.

5. The sound and vibration spectrum analyzing device of claim 2, wherein the band signal divider has a cutoff frequency between a first resonance frequency group of the first resonance mode and a second resonance frequency group of a second resonance mode of the plurality of resonators.

6. The sound and vibration spectrum analyzing device of claim 1, wherein the plurality of resonators comprises an n number of resonators, a first resonance frequency of the first resonance mode of a first resonator is f_11, a second resonance frequency of a second resonance mode of the first resonator is f_12, and resonance frequencies of the first resonance mode of second to n-th resonators are between the first resonance frequency and the second resonance frequency.

7. The sound and vibration spectrum analyzing device of claim 1, wherein resonance frequencies of the first resonance mode of the plurality of resonators are linearly arranged at same intervals.

8. The sound and vibration spectrum analyzing device of claim 1, wherein resonance frequencies of the first resonance mode of the plurality of resonators are non-linearly arranged at varying intervals.

9. The sound and vibration spectrum analyzing device of claim 1, wherein the plurality of resonators comprises a first resonator and a second resonator, each of the first resonator and the second resonator has a same resonance frequency in the first resonance mode, and the first resonator and the second resonator have different resonance frequencies in a second resonance mode.

10. The sound and vibration spectrum analyzing device of claim 1, wherein the sound and vibration spectrum analyzing device comprises effective band filters of an amount two times or more than a number of the plurality of resonators.

11. The sound and vibration spectrum analyzing device of claim 1, wherein the plurality of resonators comprises an electromechanical resonator structure.

12. The sound and vibration spectrum analyzing device of claim 1, wherein the plurality of resonators comprises a cantilever structure.

18

13. The sound and vibration spectrum analyzing device of claim 12, wherein the plurality of resonators further comprises a mass body disposed on the cantilever structure.

14. The sound and vibration spectrum analyzing device of claim 1, wherein the plurality of resonators comprises first resonators of a first group, and the first resonators have different lengths.

15. An electronic apparatus comprising the sound and vibration spectrum analyzing device as claimed in claim 1.

16. A sound and vibration spectrum analyzing device comprising:

a plurality of resonators having different center frequencies, the plurality of resonators being configured to acquire a spectrum of sound and vibration; and a band signal divider separating a first frequency signal of a first resonance mode and a second frequency signal of a second-order or higher resonance mode of each of the plurality of resonators.

17. The sound and vibration spectrum analyzing device of claim 16, wherein the sound and vibration spectrum analyzing device is configured to analyze the spectrum of sound and vibration, based on the first frequency signal of the first resonance mode and the second frequency signal of the second-order or higher resonance mode that are separated, of each of the plurality of resonators.

18. The sound and vibration spectrum analyzing device of claim 16, wherein the band signal divider comprises one of a diplexer, a duplexer, and a triplexer.

19. The sound and vibration spectrum analyzing device of claim 16, wherein the band signal divider comprises a low pass filter and a high pass filter, and each of the low pass filter and the high pass filter has a same cutoff frequency.

20. The sound and vibration spectrum analyzing device of claim 16, wherein the band signal divider has a cutoff frequency between a first resonance frequency group of the first resonance mode and a second resonance frequency group of a second resonance mode of the plurality of resonators.

21. The sound and vibration spectrum analyzing device of claim 16, wherein the plurality of resonators comprises an n number of resonators, a first resonance frequency of the first resonance mode of a first resonator is f_11, a second resonance frequency of a second resonance mode of the first resonator is f_12, and resonance frequencies of the first resonance mode of second to n-th resonators are between the first resonance frequency and the second resonance frequency.

22. A method of analyzing a sound and vibration spectrum using a plurality of resonators having different center frequencies, the method comprising:

acquiring a first frequency signal of a first resonance mode of at least some of the plurality of resonators;

acquiring a second frequency signal of a second resonance mode of the at least some of the plurality of resonators; and analyzing each of the first frequency signal of the first resonance mode and the second frequency signal of the second resonance mode.

23. The method of claim 22, further comprising separating the first frequency signal of the first resonance mode and the second frequency signal of the second resonance mode of the at least some of the plurality of resonators.

24. The method of claim 23, wherein the first frequency signal of the first resonance mode and the second frequency signal of the second resonance mode that are separated are simultaneously output by an individual resonator of the at least some of the plurality of resonators.

25. The method of claim 22, further comprising acquiring and analyzing a third frequency signal of a third-order or higher resonance mode of the at least some of the plurality of resonators.

* * * * *